(12) United States Patent
Kaarstein

(10) Patent No.: US 7,144,001 B2
(45) Date of Patent: Dec. 5, 2006

(54) DEVICE AND A SYSTEM FOR DAMPING VIBRATIONS, IMPACT AND SHOCK

(76) Inventor: Olav Kaarstein, Gauterødvelen 53, N-3154 Tolvsrød (NO)

( * ) Notice: Subject to any disclaimer, the term of this patent is extended or adjusted under 35 U.S.C. 154(b) by 0 days.

(21) Appl. No.: 10/507,282

(22) PCT Filed: Mar. 11, 2003

(86) PCT No.: PCT/NO03/00085

§ 371 (c)(1),
(2), (4) Date: Sep. 10, 2004

(87) PCT Pub. No.: WO03/076822

PCT Pub. Date: Sep. 18, 2003

(65) Prior Publication Data

US 2005/0127584 A1    Jun. 16, 2005

(30) Foreign Application Priority Data

Mar. 14, 2002    (NO) .................................. 20021282

(51) Int. Cl.
*F16F 3/00* (2006.01)
(52) U.S. Cl. ...................................... 267/136; 267/148
(58) Field of Classification Search .................. 267/69, 267/70, 73, 136, 147, 148, 134, 135; 248/610, 248/611, 612, 613, 614, 619, 570, 626, 636
See application file for complete search history.

(56) References Cited

U.S. PATENT DOCUMENTS

| 2,604,315 | A | | 7/1952 | Patterson |
| 2,723,114 | A | * | 11/1955 | Dentler ........................ 267/134 |
| 2,910,263 | A | * | 10/1959 | Hoekstra ..................... 248/604 |
| 3,450,349 | A | * | 6/1969 | Hamon ..................... 239/428.5 |
| 3,588,008 | A | | 6/1971 | Wyman |
| 4,586,689 | A | * | 5/1986 | Lantero ...................... 248/570 |
| 4,725,048 | A | | 2/1988 | Jarret |
| 4,783,038 | A | * | 11/1988 | Gilbert et al. .............. 248/570 |
| 5,240,232 | A | * | 8/1993 | Loziuk ........................ 267/136 |
| 5,277,394 | A | * | 1/1994 | Slemmer ..................... 248/570 |
| 5,294,085 | A | | 3/1994 | Lloyd |
| 5,791,636 | A | * | 8/1998 | Loziuk ........................ 267/136 |

FOREIGN PATENT DOCUMENTS

| DE | 2909934 | | 3/1979 |
| EP | 59143 A1 | * | 9/1982 |
| GB | 2004621 | | 4/1979 |
| JP | 06014823 | | 1/1994 |

\* cited by examiner

*Primary Examiner*—Thomas Williams
(74) *Attorney, Agent, or Firm*—Christian D. Abel

(57) ABSTRACT

The invention relates to a device and a system for damping vibrations, impact and shock where two damping elements (6, 8) are attached to one end of an oblong plate (4) respectively, and connected via a central joining element (7) holding the device exposed to vibrations. The damping elements (6, 8) may be in the form of wire rings.

2 Claims, 1 Drawing Sheet

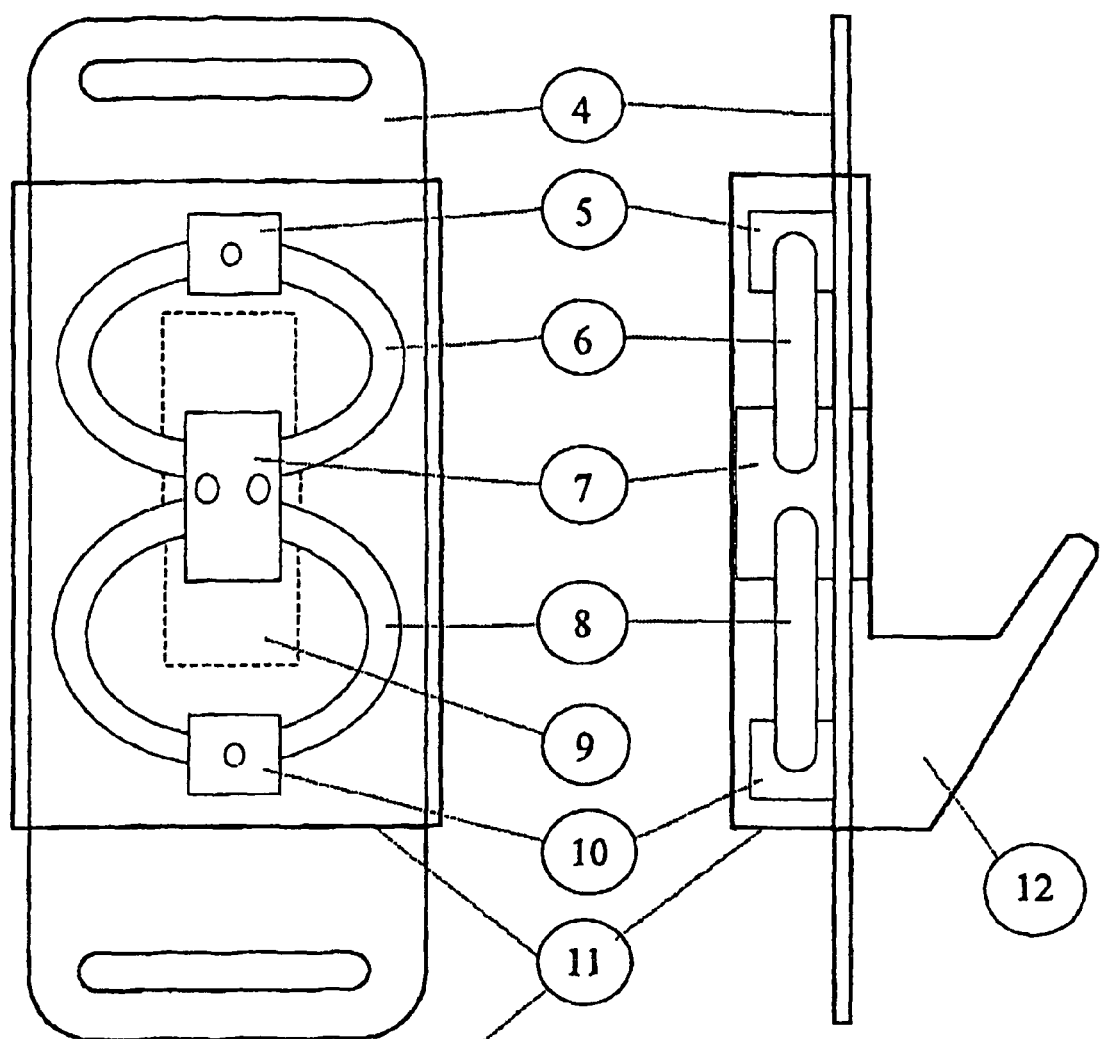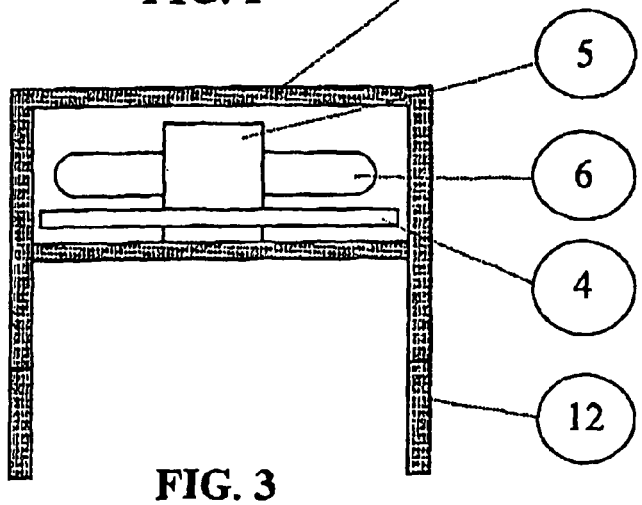
FIG. 1
FIG. 2
FIG. 3

DEVICE AND A SYSTEM FOR DAMPING VIBRATIONS, IMPACT AND SHOCK

The invention relates to a device and a system for damping vibrations, impact and shock on objects mounted on or in reference objects exposed to vibration, impact and shock or a particularly stressed environment. The invention relates especially to a system for damping vibrations, impact and shock in connection with the attachment and installation of equipment in boats, planes and vehicles, which are exposed to severe shaking. An example of this is the attachment of stretcher stands and seats in boats, etc. that are used by armed forces or in a competitive situation.

The Norwegian Defence has been searching for some time for methods of damping vibrations, impact and shock in particularly exposed environments, such as, for example, in armoured vehicles, planes and boats.

Vibrations often occur in connection with the reference object's natural frequencies, the influence of, e.g., motor drive and/or other oscillating, frequently mechanical, sources.

Impacts usually occur due to external influence on the reference object, for example boats, cars, armoured vehicles, planes et al, where the reference object is in motion and interferes with the adjacent external environment.

Shock occurs, e.g., in connection with detonation of explosive bodies in the immediate vicinity of the reference object, or explosions/rapid energy discharges in the reference object itself. Sudden braking when travelling by boat in heavy seas or when driving vehicles in the terrain may also produce less severe shock-generating stresses.

It is therefore an object of the present invention to provide a device that can damp vibrations, impact and shock by being placed between the object that is exposed to the stresses and the device that will only experience dampened stresses.

A device according to the invention is also indicated in the following independent claim 1 with various embodiments as indicated in claims 2–5. The preferred embodiment is illustrated in the attached figures and described in the following detailed description with reference to the figures. The embodiment is preferred since it has been shown to give good results in tests and since it can be implemented technically within the desired framework. Furthermore, the sleeve enveloping the wire rings covers the rings and prevents anything becoming entangled therein.

Furthermore, according to the present invention a system is indicated in claim 6 for damping vibrations, impact and shock. Various embodiments are set forth in the following dependent claims 7–10.

In order to express the invention in specific terms, we shall elucidate the principle by means of a description with an example of the damping of vibrations, impact and shock when transporting patients lying on stretchers in military transport units on land, sea and air. However, the solution can easily be employed in other contexts, such as in seats or other personnel-carrying equipment, or securing of particularly sensitive equipment.

Many of these transport units have poorly damped movements, and expose goods and personnel to substantial and varying G-loads. A commonly used method of shock absorption, e.g., is isolation with elastic material or the use of shock absorbers which compress gas or liquid or work against a dynamic pressure. These solutions, however, have limitations, such as the magnitude of the shocks they can absorb and dampen.

The object of the invention is to absorb energy from direction-specific vibrations, impact and shock by the energy being essentially transformed into heat through a combination of wire rings with different characteristics, connected in a system.

The device consists substantially of a plate, which is attached to the reference object—in this case a car, boat, plane or the like—by means of screwing, welding strapping or the like, and which forms an attachment for one part of a wire ring. An enveloping sleeve, which includes the attachment point for the object that has to be damped, is attached enclosingly around the wire ring. The energy transformation takes place by the wire ring being deformed by tension or pressure depending on the forces involved in the loading. In order to provide optimal function and correct damping with regard to the natural frequency of the total system, the system is supplemented by a wire ring designed according to the requirements for optimal function of the system. Ring no. two is also attached to the plate, which is attached to the reference object at the opposite end of the plate relative to wire ring no. one. The two wire rings now represent a "figure of eight" since the two wire rings are interconnected at a common movable point which, when attached to the enveloping external sleeve, forms the damped movable part of the system.

When the system is subjected to stress in the system's damping direction, the wire rings will interfere with each other, with one wire ring being compressed while the other is stretched.

The heat developed by the transformation of kinetic energy from vibration, impact and shock in the system is evacuated from the system by means of convection. Wire rings with attachment blocks are mounted inside the enveloping sleeve. This sleeve is oriented vertically and open at the top and bottom. This causes the air that is heated up by the system inside the sleeve to rise and air at ambient temperature follows, keeping the system temperature at an acceptable level.

The characterising feature of the invention is that, with correct calculation of the size of the wire rings, dimension of the wire and combinations thereof, optimal energy absorption can be achieved with regard to expected vibration, impact and shock level and weight of the object that has to be damped.

Data simulations of the effect of the system when it is optimally designed demonstrate that it meets the requirements with regard to the most extreme situations to which the system can be exposed. For example, the system for suspension of a stretcher with patient will be able to tackle a mine detonation in the immediate vicinity of the reference object, corresponding to a load of 3000 G in 10 msec.

The system has been successfully tested in high-speed boats and armoured vehicles.

The shock absorber according to the invention is illustrated in the attached drawings, in which:

FIG. 1 is a sectional view from in front through a device according to the invention;

FIG. 2 is a sectional view from the side of the device in FIG. 1;

FIG. 3 is a sectional view from above of the device in FIGS. 1 and 2.

Referring to the figures, the plate 4 is illustrated prepared for attachment to the reference object A (car, boat, plane, motor, etc., not shown) by means of straps, screws, welding or the like. Upper wire ring attachment 5 is fixed to the plate 4, and upper wire ring 6 is fixed to the upper part by the wire being passed through a hole in the upper wire attachment 5.

Upper wire ring 6 is connected to lower wire ring 8 in a freely movable unit; middle wire attachment 7 can move linearly along a groove 9 stamped out in the attachment plate 4. Both the wire rings 6 and 8 are joined/connected inside the intermediate wire attachment 7. The middle wire attachment 7 is fixed to the system's enveloping movable sleeve 11, damping it. Lower wire ring 8 is fixed to the bottom of plate 4 at lower wire ring attachment 9 in the same way as upper wire ring 6 is fixed to upper wire attachment 5. The dampened movable sleeve 11 is coated internally with sliding coating/plates.

The examples in the figures illustrate a shock absorber intended for stretchers where the enveloping shock-absorbing movable sleeve 11 is designed as a shelf bracket 12 for stretcher installations.

It is not necessarily a ring of a "wire" that gives the optimal result when using the invention and it is obvious that this element may be replaced by another element with similar characteristics. It is the element's material properties and total characteristics as a damping element that matter. Different materials and designs may therefore be employed which do not produce permanent deformation in the event of impact or shock (or vibrations) and which have a response that gives the desired and adequate damping. Alternatives in synthetic materials etc. may be employed.

The invention claimed is:

1. A device for damping vibrations, impact and shock in a longitudinal direction, which device is mounted between a reference object (A), which is exposed to vibrations, impact and shock, and a device (B), which will only be exposed to dampened vibrations, impact and shock, comprising an oblong plate (4), which is designed at its opposite upper and lower ends in the longitudinal direction to be attached to the reference object (A), where an upper and a lower attachment (5, 10) are fixed to the plate (4) for an upper and lower damping element (6, 8) respectively, which damping elements (6, 8) are connected via a joining element (7) between the upper and lower attachment (5, 10) for the damping elements, and wherein joining element (7) is free to travel in the longitudinal direction in a slot (9) arranged in plate (4), and which joining element (7) in turn is fixed to a holder for the device (B) that will only be exposed to dampened vibrations, impact and shock and that the damping elements (6, 8) are wire rings arranged such that their respective diameters lie in a plane parallel to the longitudinal plane defined by the face of oblong plate (4), characterised in that the joining element (7) is attached to a sleeve (11), which envelops the plate (4) and the damping elements (6, 8), which in turn are fixed to the holder for the device (B).

2. A system for damping vibrations, impact and shock, between a reference object (A), which is exposed to vibrations, impact and shock, and a device (B), which will be exposed to dampened vibrations, impact and shock in the longitudinal direction, wherein the device (B) is supported by one or more devices for damping vibrations, impact or shock, which devices consist substantially of a plate (4), which is oblong in the longitudinal direction and which is attached at its opposite upper and lower ends in the longitudinal direction to the reference object (A), where an upper and lower attachment (5, 10) are fixed to the plate (4) for an upper and lower wire ring (6, 8) respectively, which wire rings (6, 8) are arranged such that their respective diameters lie in a plane parallel to the face of oblong plate (4), and which wire rings are connected via a joining element (7) between the upper and lower attachment (5, 10), and which joining element (7) is arranged at least partially within, and is free to move in, a slot (9) in the plate (4) and in turn is fixed to a holder for the device (B) that will thus be exposed to dampened vibrations, impact and shock in the longitudinal direction, characterised in that the joining element (7) is attached to a sleeve (11), which envelops the plate (4) and the wire rings (6, 8), which in turn are fixed to the holder for the device (B).

* * * * *